(12) United States Patent
Heo et al.

(10) Patent No.: US 11,422,254 B2
(45) Date of Patent: Aug. 23, 2022

(54) RADAR SENSOR APPARATUS FOR VEHICLE, OBJECT DETECTING METHOD, AND ANTENNA APPARATUS THEREFOR

(71) Applicant: MANDO MOBILITY SOLUTIONS CORPORATION, Gyeonggi-do (KR)

(72) Inventors: Sung Joon Heo, Gyeonggi-do (KR); Su Han Kim, Gyeonggi-do (KR)

(73) Assignee: MANDO MOBILITY SOLUTIONS CORPORATION, Gyeonggi-do (KR)

( * ) Notice: Subject to any disclaimer, the term of this patent is extended or adjusted under 35 U.S.C. 154(b) by 191 days.

(21) Appl. No.: 16/779,485

(22) Filed: Jan. 31, 2020

(65) Prior Publication Data
US 2020/0249344 A1    Aug. 6, 2020

(30) Foreign Application Priority Data

Feb. 1, 2019    (KR) .......................... 10-2019-0013380

(51) Int. Cl.
| | |
|---|---|
| *G01S 13/931* | (2020.01) |
| *G01S 7/03* | (2006.01) |
| *G01S 13/04* | (2006.01) |

(52) U.S. Cl.
CPC ............ *G01S 13/931* (2013.01); *G01S 7/032* (2013.01); *G01S 13/04* (2013.01); *G01S 2013/93271* (2020.01)

(58) Field of Classification Search
CPC .. G01S 13/931; G01S 13/93271; G01S 13/04; G01S 13/03; G01S 13/032

USPC .............................................. 342/27, 70, 107
See application file for complete search history.

(56) References Cited

U.S. PATENT DOCUMENTS

| | | | | |
|---|---|---|---|---|
| 6,686,867 | B1* | 2/2004 | Lissel | H01Q 25/002 342/70 |
| 8,976,061 | B2* | 3/2015 | Chowdhury | G01S 13/931 342/175 |
| 2008/0266169 | A1* | 10/2008 | Akita | B60W 40/04 342/117 |
| 2019/0072659 | A1* | 3/2019 | Gu | G01S 13/42 |

FOREIGN PATENT DOCUMENTS

| | | | | |
|---|---|---|---|---|
| CN | 107515399 A | * | 12/2017 | |
| JP | 4085840 | | 5/2008 | |
| JP | 2008170193 A | * | 7/2008 | ............... G01S 3/46 |
| KR | 10-1223804 | | 1/2013 | |
| KR | 10-1534225 | | 7/2015 | |

* cited by examiner

*Primary Examiner* — Erin F Heard
*Assistant Examiner* — Michael W Justice
(74) *Attorney, Agent, or Firm* — Ladas & Parry, LLP

(57) ABSTRACT

The present disclosure relates to a radar sensor apparatus for a vehicle, a method of detecting an object using the radar sensor apparatus, and an antenna apparatus for the radar sensor apparatus. The antenna apparatus includes N (N is an even number greater than or equal to 4) transmitting antennas and a divider. Since the divider is configured such that a preset value is set on a power ratio that is a ratio of power supplied to each transmitting antenna and a phase ratio that is a ratio of phase of a signal transmitted from each transmitting antenna, it is possible to detect a mid/long range target and a short range target simultaneously.

19 Claims, 15 Drawing Sheets

Azimuthal & Angle(Azimuthal & Angle)

Azimuthal & Angle(Azimuthal & Angle)

RADAR SENSOR APPARATUS FOR VEHICLE, OBJECT DETECTING METHOD, AND ANTENNA APPARATUS THEREFOR

CROSS-REFERENCE TO RELATED APPLICATION

This application claims the priority benefit of Korean Patent Application No. 10-2019-0013380, filed on Feb. 1, 2019 in the Korean Intellectual Property Office, the disclosure of which is incorporated herein by reference in its entirety.

BACKGROUND

1. Field of the Disclosure

The present disclosure relates to a radar sensor apparatus for a vehicle, a method of detecting an object using the radar sensor apparatus, and an antenna apparatus for the radar sensor apparatus.

2. Description of the Background

A radar sensor apparatus mounted on vehicles etc. is widely used as a sensor apparatus for performing vehicle control, and can perform a function of extracting the position or speed information of an object by transmitting electromagnetic waves with a constant frequency, receiving signals reflected from the object, and then processing the received signals.

A radar used for such vehicle control is required to have a high angular resolution, and have a mid/long range detection function to detect a remote object in a relatively narrow angle range and a short range detection function to detect a nearby object in a relatively wide angle range, using a single antenna assembly.

Meanwhile, in typical radar sensor apparatuses used for a vehicle, a transmission beam for mid/long range detection is needed to have a long range beam pattern that is sharp in order to have a relatively narrow detection area and travel as far as possible, and a transmission beam for short range detection is needed to have a short range beam pattern that covers a relatively wide detection area.

To form separately the long range beam pattern and the short range beam pattern, the typical radar sensor apparatuses are generally equipped with both a mid/long range transmitting antenna Tx_LR and a short range transmitting antenna Tx_SR.

Accordingly, such radar sensor apparatuses configured to perform both a mid/long range detection mode and a short range detection mode need increased number of transmitting antennas that act as an obstacle to the miniaturization of a corresponding sensor, and has a disadvantage of an increased amount of computation because it is required to perform separate computation and signal processing for mid/long range detection and short range detection.

To address these issues, in accordance with embodiments of the present disclosure, provided are a radar sensor apparatus for a vehicle with a simplified configuration and a small amount of computation, and a transmission beam forming scheme for the radar sensor apparatus.

SUMMARY

It is at least one object of the present disclosure to provide a radar sensor apparatus for a vehicle with a simplified configuration and small amount of computation, and an antenna apparatus for the radar sensor apparatus.

To achieve objects of the present disclosure, in accordance with one aspect of the present disclosure, a radar sensor apparatus for a vehicle is provided that comprises a transmitting antenna assembly including N (N is an even number greater than or equal to 4) transmitting antennas, a receiving antenna assembly, a divider for supplying signals to the N transmitting antennas of the transmitting antenna assembly, and a controller causing a transmission signal with a constant transmission beam pattern to be transmitted via the transmitting antenna assembly and obtaining information on a target by processing signals received from the receiving antenna assembly. The divider is configured such that a preset value is set on a power ratio that is a ratio of power supplied to each transmitting antenna and a phase ratio that is a ratio of phase of a signal transmitted from each transmitting antenna; as a result, the transmission beam pattern is formed to have a form allowing both a first range target and a second range target to be detected.

In accordance with another aspect of the present disclosure, an antenna apparatus used in a radar sensor apparatus for a vehicle is provided which comprises a transmitting antenna assembly including N (N is an even number greater than or equal to 4) transmitting antennas, a receiving antenna assembly, a feed line connected to the N transmitting antennas of the transmitting antenna assembly, and a divider for supplying signals to the N transmitting antennas of the transmitting antenna assembly, The divider is configured such that a width and a length of the feed line connected to each transmitting antenna are set so that a preset value can be set on a power ratio that is a ratio of power supplied to each transmitting antenna and a phase ratio that is a phase ratio of a signal transmitted from each transmitting antenna.

In accordance with further another aspect of the present disclosure, a detection method is provided of using a radar sensor apparatus for a vehicle which comprises a transmitting antenna assembly including N (N is an even number greater than or equal to 4) transmitting antennas, a receiving antenna assembly, a divider for supplying signals to the N transmitting antennas of the transmitting antenna assembly, and a controller. More specifically, by setting a preset value on a power ratio that is a ratio of power supplied to each transmitting antenna and a phase ratio that is a ratio of phase of a signal transmitted from each transmitting antenna using the transmitting antenna assembly and the divider, a method of detecting an object is provided of transmitting a signal in a transmission beam pattern having a form allowing both a first range target and a second range target to be detected, receiving one or more signals reflected from one or more of the first range target and the second range target using the receiving antenna assembly, and obtaining information on one or more or the first range target and the second range target by processing the one or more received signals using the controller.

In accordance with embodiments of the present disclosure specifically described below, it is possible to provide a radar sensor apparatus for a vehicle with a simplified configuration and a small amount of computation, and an antenna apparatus for the radar sensor apparatus.

DETAILED DESCRIPTION

Figure 1:
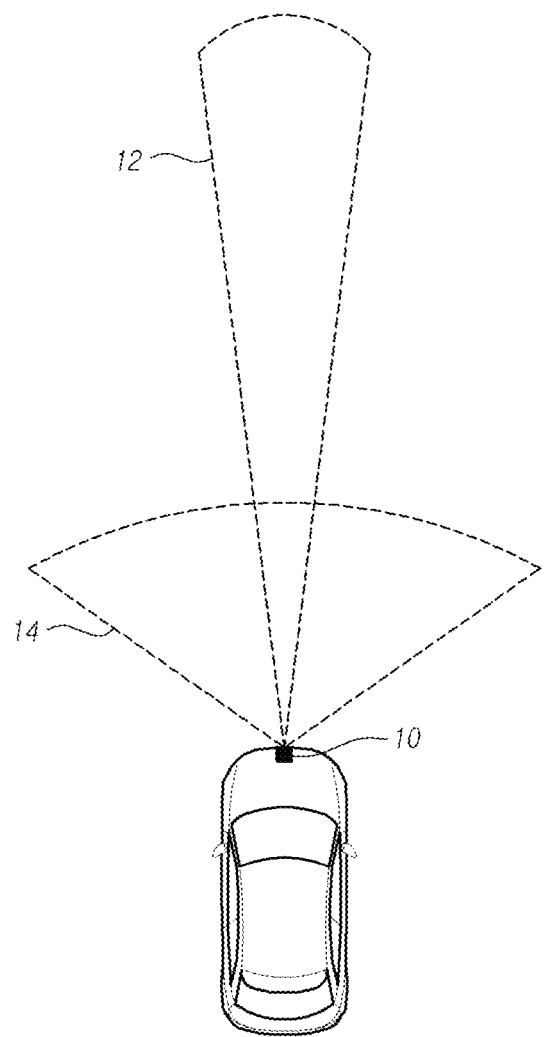
FIG. 1 is a diagram illustrating an example of detecting an object by a typical radar sensor for a vehicle, and shows a mid/long range detection area and a short range detection area.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

In the present disclosure, two types of detection ranges are separately described for discussing embodiments of implementing the two types of detection ranges via a single transmitting antenna assembly. For example, the two types of detection ranges may be a first range and a second range which are different from each other. The first range may be set longer than the second range, and a detection angle with the first range may be set narrower than a detection angle with the second range. That is, the first range may be a mid/long range detection area, and the second range may be a short range detection area. However, embodiments of the present disclosure are not limited thereto. For example, the first range may a long range detection area, and the second range may be a mid range detection area. Accordingly, the first range and the second range herein are used in a relative meaning. Hereinafter, for the convenience of description and the ease of understanding, discussions are conducted by defining the first range and the second range as a mid/long range and a short range, respectively.

FIG. 1 is a diagram illustrating an example of detecting an object by a typical radar sensor for a vehicle, and shows a mid/long range detection area and a short range detection area.

Referring to FIG. 1, when a radar sensor for a vehicle is used for detecting an object adjacent to a vehicle, the radar sensor is needed to have both a mid/long range detection function of detecting a long range target ahead of the vehicle and a short range detection function of detecting a short range target adjacent to the vehicle.

In a vehicle on which a radar sensor is mounted, various types of driver assistance systems (DAS) are used for drive assistance of a driver.

An adaptive cruise system (ACC) tracking a vehicle located ahead among the driver assistance systems is needed to have capabilities to detect a mid/long range target located ahead in the direction of travel of the host vehicle.

Meanwhile, an autonomous emergency braking (AEB) system or an autonomous emergency steering (AES) system for allowing a vehicle to be braked or steered urgently when an obstacle is located ahead, a lane changing assistance (LCA) system for preventing the vehicle from colliding with an obstacle in an adjacent lane when a lane change is performed, and the like are needed to have capabilities to detect an obstacle adjacent to the vehicle with high accuracy.

To meet such requirements, as illustrated in FIG. 1, the vehicle radar sensor apparatus is needed to have both a long range (a first range) detection area 12 characterized by a relatively narrow detection angle and a relatively long detection range for mid/long range detection and a short range (a second range) detection area 14 characterized by a relatively wide detection angle and a relatively short detection range for short range detection.

To do this, the vehicle radar sensor apparatus is needed to transmit a transmission signal in the pattern of a mid/long range transmission beam for mid/long range detection and transmit a transmission signal in the pattern of a short range transmission beam different from that of the mid/long range transmission beam for short range detection.

Thus, in a radar for a vehicle, it is desirable to integrate a mid/long range radar and a short range radar, and as a method of integrating the mid/long range radar and the short range radar, one or more transmitting antennas can be separately used, and one or more receiving antennas can be commonly used.

Figure 2:
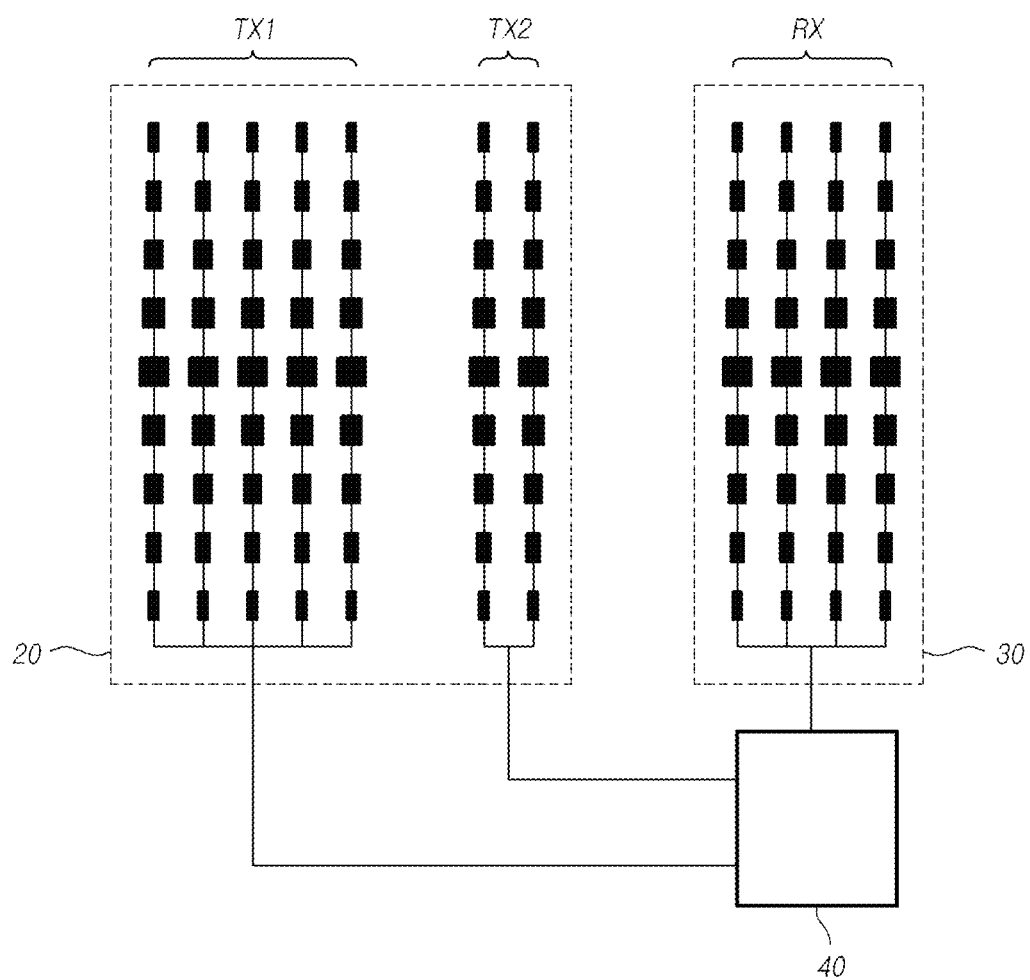
FIG. 2 is a diagram illustrating an example of a specific configuration of a typical vehicle radar sensor apparatus including a mid/long range transmitting antenna assembly and a short range transmitting antenna assembly.

FIG. 2 is a diagram illustrating an example of a specific configuration of a typical vehicle radar sensor apparatus including a mid/long range transmitting antenna assembly and a short range transmitting antenna assembly.

Referring to FIG. 2, the typical radar sensor apparatus for a vehicle comprises an antenna apparatus including a transmitting antenna assembly 20 and a receiving antenna assembly 30. The transmitting antenna assembly 20 comprises a first transmitting antenna Tx1 for a mid/long range for long range detection and a second transmitting antenna Tx2 for a short range for short range detection.

A receiving antenna Rx of the receiving antenna assembly 30 is commonly used in both a mid/long range detection mode and a short range detection mode. The two transmitting antennas Tx1 and Tx2 may arranged to be spaced apart from each other by a certain distance, and the receiving antenna Rx may be arranged on one side of the transmitting antennas Tx1 and Tx2.

In this case, the second transmitting antenna Tx2 for the short range may be disposed between the first transmitting antenna Tx1 for the mid/long range and the receiving antenna Rx; however, embodiments of the present disclosure are not limited thereto.

The radar sensor apparatus further comprises a signal processor 40, such as a digital signal processor (DSP).

The signal processor controls the radar sensor apparatus to transmit a signal via the transmitting antenna assembly and to receive a signal reflected from an object via the receiving antenna, and extracts or computes information on the object, such as a distance, a speed, an angle, or the like of the object, based on the received signal.

Meanwhile, the radar sensor apparatus may be classified into a pulse type, a frequency modulation continuous wave (FMCW) technique, a frequency shift keying (FSK) technique, and the like according to the form of a signal used.

The FMCW radar uses a chirp signal or a ramp signal, which is a signal whose frequency increases over time, and extracts or computes information on an object using a time difference between a transmitting wave and a receiving wave and a Doppler frequency shift.

Further, the vehicle radar sensor may use a time division multiplexing technique for mid/long range detection and short range detection.

That is, during a first detection period, the radar sensor detects a long range object by transmitting a transmission wave in the pattern of a transmission beam for long range detection and receiving a reflection wave corresponding to the transmission wave. During a second detection period, the radar sensor detects a short range object by transmitting a transmission wave in the pattern of a transmission beam for short range detection and receiving a reflection wave corresponding to the transmission wave.

Figure 3:
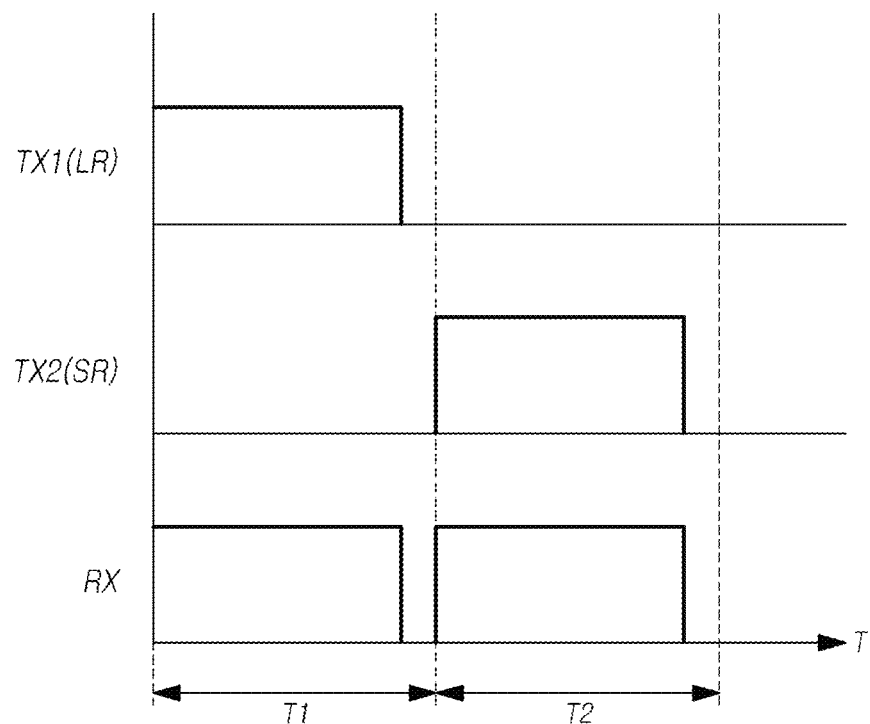
FIG. 3 is a timing diagram illustrating signals transmitted from and received to the typical radar sensor apparatus as shown in FIG. 2.

FIG. 3 is a timing diagram illustrating signals transmitted from and received to the typical radar sensor apparatus as shown in FIG. 2.

As shown in FIG. 3, during a first detection period T1, the first transmitting antenna Tx1 for the long range and the receiving antenna Rx are turned on, and a long range object can be detected by transmitting a transmission wave in a transmission beam pattern for long range detection and receiving a reflection wave corresponding to the transmission wave.

During a subsequent second detection period T2, the second transmitting antenna Tx2 for the short range and the receiving antenna Rx are turned on, and a short range object can be detected by transmitting a transmission wave in a transmission beam pattern for short range detection and receiving a reflection wave corresponding to the transmission wave.

Figure 4:
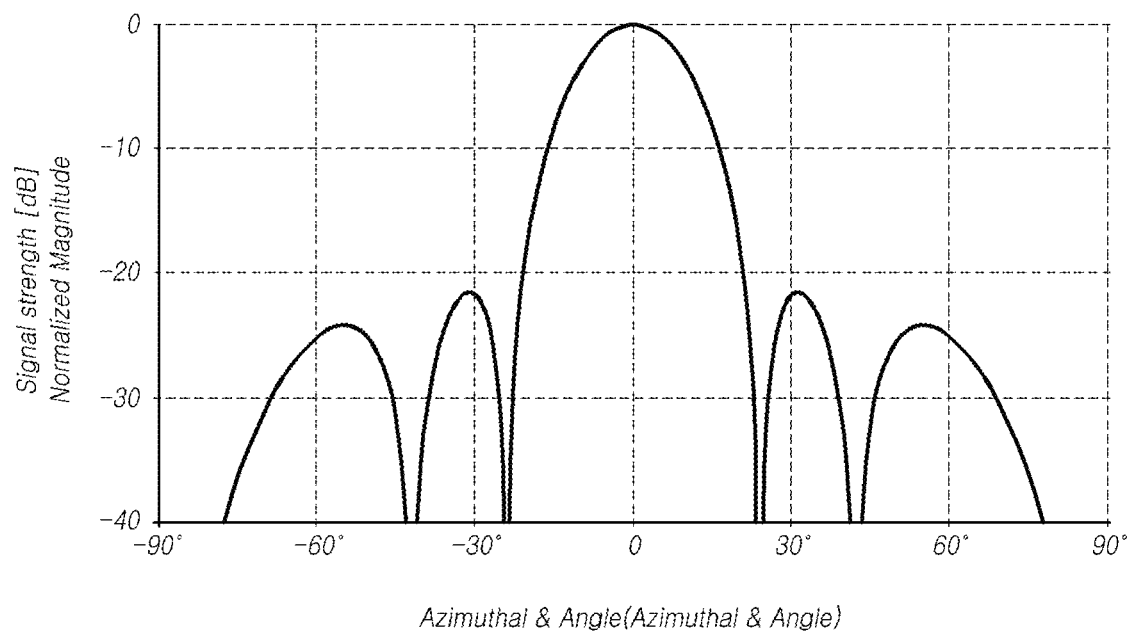
FIG. 4 illustrates examples of a mid/long range transmission beam pattern and a short range transmission beam pattern in the radar sensor apparatus as shown in FIG. 1.
Figure 4:
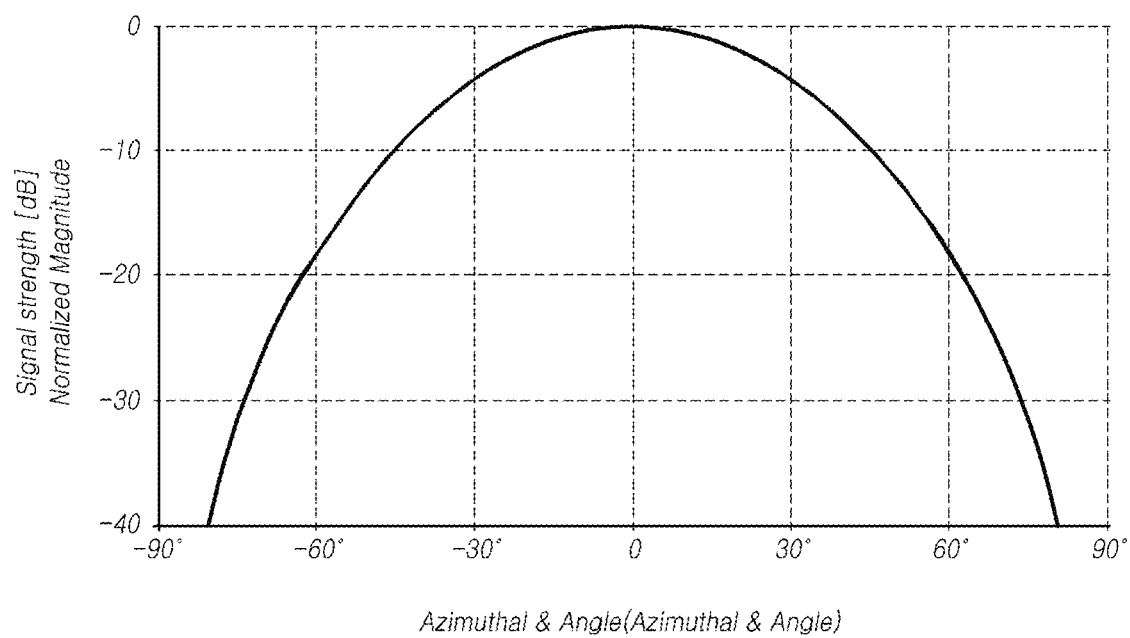

FIG. 4 illustrates examples of a mid/long range transmission beam pattern and a short range transmission beam pattern in the radar sensor apparatus as shown in FIG. 1.

In this case, for the mid/long range detection, it is necessary to detect an object located at a relatively long distance, for example, about 50-150 meters or more; however, it is difficult to transmit a transmission beam in a long distance and a wide range due to a limited capability to output a radar signal.

Accordingly, the transmission beam pattern for mid/long range detection is needed to have a sharp form with a relatively long reach distance and a relatively small detection angle.

On the contrary, the short range detection is needed to detect more accurately a distance from a vehicle to an object and have a larger detection angle, compared with the long range detection.

That is, the short range detection mode is generally for preventing a collision with an object adjacent to a vehicle; therefore, it is needed to have a larger detection angle and more increased accuracy of distance detection, compared with the the the mid/long range detection mode.

Accordingly, for the transmission beam pattern for short range detection, beams are needed to radiate in a relatively wide detection angle range.

Accordingly, in the mid/long range transmission beam pattern, a main lobe having a relatively small radiation angle and a greater signal strength is arranged near the azimutal angle of 0°, and side lobes having a gradually reduced signal strength are arranged symmetrically on both sides of the main lobe, as shown in the upper graph of FIG. 4.

On the contrary, in the short range transmission beam pattern, a single lobe having a relatively large radiation angle is formed as shown in the lower graph of FIG. 4.

To do this, the first transmitting antenna Tx1 for the mid/long range is designed to include a relatively large number of array antennas, and by selectively adjusting power of a plurality of array antennas, it is possible to form a transmission beam pattern that is sharp as shown in the upper graph of FIG. 4.

On the contrary, the second transmitting antenna Tx2 for the short range is designed to form a transmission beam pattern with a relatively wide radiation range using only one or two array antennas.

At this time, in the mid/long range transmission beam pattern (as in the upper graph of FIG. 4), the side lobes may act as a noise in detection; therefore, it is necessary to minimize such side lobes. In particular, it is desirable for a null point NP1, NP2 at which a signal strength falls to 0 to be formed between the main lobe and each of the side lobes.

As shown in FIGS. 1 to 4, in the typical vehicle radar sensor apparatus, the mid/long range detection and the short range detection are needed to be performed separately; therefore, this presents a number of disadvantages, including increased complexity of the apparatus and an increased computational load.

That is, in the radar sensor in FIGS. 1 to 4, since it is necessary for the first transmitting antenna Tx1 for the mid/long range and the second transmitting antenna Tx2 for the short range to be arranged separately; therefore, the typical radar sensor has disadvantages that become more complicated and larger.

Further, for the mid/long range detection and the short range detection, it is necessary to detect an object during respective transmit periods using transmission beam patterns different from each other; therefore, the typical radar sensor has disadvantages including increased complexity of the apparatus and an increased computational load.

To address these issues, in the present disclosure, a method is provided of forming a transmission beam pattern for allowing the mid/long range detection and the short range detection to be performed simultaneously using a single transmitting antenna assembly.

More specifically, in accordance with embodiments of the present disclosure, a radar sensor apparatus includes N (N is an even number greater than or equal to 4) transmitting antennas, and a divider. The divider is configured such that a preset value is set on a power ratio that is a ratio of power supplied to each transmitting antenna and a phase ratio that is a ratio of phase of a signal transmitted from each transmitting antenna; as a result, a transmission beam pattern can be formed so that the mid/long range detection and the short range detection can be performed simultaneously. Through this, in the present disclosure, a method is provided for detecting a wide range of objects.

Figure 5:
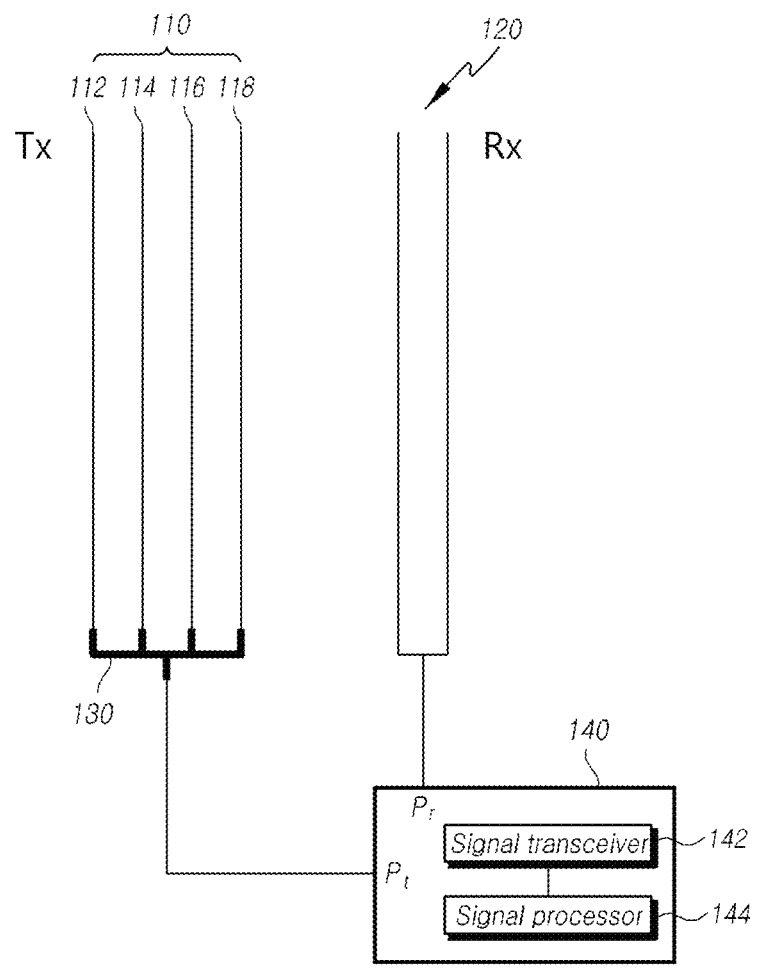
FIG. 5 is a diagram illustrating a configuration of a radar sensor apparatus in accordance with embodiments of the present disclosure.
Figure 6:
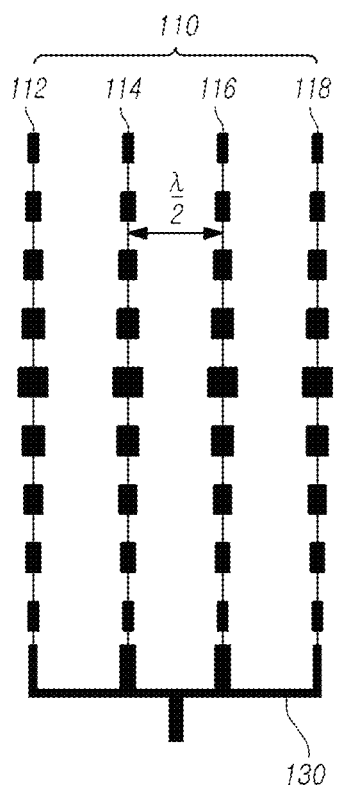
FIG. 6 is an enlarged diagram illustrating a transmitting antenna assembly and a divider of an antenna apparatus included in the radar sensor apparatus in accordance with embodiments of the present disclosure.

FIG. 5 illustrates the overall configuration of a radar sensor apparatus in accordance with embodiments of the present disclosure. FIG. 6 is an enlarged diagram illustrating a transmitting antenna assembly and a divider of an antenna apparatus included in the radar sensor apparatus in accordance with embodiments of the present disclosure.

The vehicle radar sensor apparatus 100 according to embodiments of the present disclosure can include a transmitting antenna assembly 110 including a plurality of transmitting antennas, a receiving antenna assembly 120, a divider 130 supplying an electrical signal causing a transmission beam to be radiated to each transmitting antenna, and a controller 140. Here, the divider 130 may include one or more feed lines.

The transmitting antenna assembly 110 may include N (N is an even number greater than or equal to 4) transmitting antennas 112, 114, 116, and 118, and each transmitting antenna may be an array antenna in which a plurality of transmitting/receiving elements is connected to one another in series through at least one transmission line; however, embodiments of the present disclosure are not limited thereto.

Each antenna used in the present disclosure extends to have a constant directionality, and the extension direction in this case refers to a direction in which the antenna extends relative to a transmission port connected to the controller 140.

That is, the transmitting antenna assembly 110 used the radar apparatus in accordance with embodiments of the present disclosure may include four or more even-numbered array antennas that extend in parallel with one another in an identical direction.

As discussed below, in the radar sensor apparatus in accordance with embodiments of the present disclosure, it is needed to form a single transmission beam pattern allowing both a mid/long range target and a short range target to be detected by providing a signal having a constant power ratio and a constant phase ratio to each of the plurality of transmitting antennas using the divider 130.

To do this, in the divider, a first power ratio and a first phase ratio is allocated to two transmitting antennas located in a center area among the plurality of transmitting antennas, and the power ratio and the phase ratio are configured to decrease symmetrically toward both sides from the center area. Accordingly, the transmitting antenna assembly 110 in accordance with embodiments of the present disclosure is desirable to include N transmitting antennas, where N is an even number greater than or equal to 4.

The receiving antenna assembly 120 may also include one or more array antennas or one or more receiving antennas; however, embodiments of the present disclosure are not limited thereto. For example, the receiving antenna assembly 120 may include two or more array antennas.

Respective array antennas included in the transmitting antenna and the receiving antenna may include a plurality of elements or patches connected to one or more output line(s) of the divider, and extend in an upper direction (a first direction) from a feeding port connected to a chip including the controller or an input port of the divider as a starting point.

Further, the four or more transmitting antennas included in the transmitting antenna assembly 110 may be arranged to be spaced apart by a half distance ($0.5\lambda$) of the wavelength of a transmission signal in a second direction perpendicular to the extending direction (the first direction) of each array antenna, and receiving antennas included in the receiving antenna assembly 120 may be also arranged to be spaced apart by a half distance ($0.5\lambda$) of the wavelength of a transmission signal.

Thus, by setting a horizontal distance between the transmitting antennas or receiving antennas by a half distance ($0.5\lambda$) of the wavelength of a transmission signal, it is possible to overcome angle ambiguity caused by a grating lobe.

That is, since an interval between receiving antennas is greater than or equal to a half distance ($0.5\lambda$) of the wavelength of a transmission signal, there is a possibility that the grating lobe may occur. By arranging a horizontal distance between the receiving antennas to $0.5\lambda$ and comparing angle information obtained from channels of respective receiving antennas and then compensating for based on the compared result, it is possible to minimize angle ambiguity caused by the grating lobe.

The transmitting antenna assembly 110 and the receiving antenna assembly 120 may be connected to a transmission port Pt and a reception port Pr of the controller 140, respectively, using one or more transmission line(s), the divider 130, and the like.

The divider 130 in accordance with embodiments of the present disclosure is connected to the controller that is a control chip, and used to supply a transmission signal with a constant power ratio and phase ratio to each transmitting antenna.

In particular, in order for a transmission beam pattern to form beams for enabling both a mid/long range target and a short range target to be detected, in the divider 130, it is possible to set a preset value on a power ratio that is an amplitude ratio of signals supplied to respective transmitting antennas 112, 114, 116, and 118 included in the transmitting antenna assembly 110, and a phase ratio that is a phase ratio of signals transmitted from the respective transmitting antennas.

In this case, a pattern of transmitted beams radiated by the transmitting antenna assembly and the divider may include a main part with a central peak for long range target detection and side parts located on both sides of the main part for short range target detection, wherein a null point is not formed between the main part and each of the side parts.

Further, the power ratio is set such that power of two first transmitting antennas arranged in a center area among the N transmitting antennas has a greater value than power of second transmitting antennas arranged in both side areas of the center area.

Further, the phase ratio may be set such that, when defining a first phase of a signal transmitted from two first transmitting antennas arranged in the center area among the N transmitting antennas and a second phase of a signal transmitted from second transmitting antennas arranged in both side areas of the center area, in case the first phase is set to 0°, and then the second phase can be set to a phase value of one of 0° to 120°.

In this case, the first phase and the second phase may have an identical value or different values to each other.

The divider 130 may include one or more feed lines connected from the controller to each transmitting antenna. The power ratio may be set by varying a width of an output-side feed line of such feed lines, and the phase ratio may be set by varying a length of a feed line connected to each transmitting antenna.

Alternatively, a preset power ratio can be set depending on a width of an output-side feed line connected to each transmitting antenna, and a preset phase ratio can be set depending on a length of a feed line connected to each transmitting antenna.

The configuration of the divider 130 will be described in detail below with reference to FIGS. 7 and 8.

The controller 140 may include a signal transceiver 142 for controlling the transmission and reception of signals via the transmitting antenna and the receiving antenna, and a signal processor 144 for extracting information on a target (for example, a location, a distance, an angle, or the like) using a reflection signal received from the receiving antenna and a transmission signal.

The signal transceiver 142 may include a transmitter and a receiver, and the transmitter may include an oscillator for generating a transmission signal by supplying a signal to each transmitting antenna at a power ratio and a phase ratio according to embodiments of the present disclosure. Such an oscillator may include, for example, a voltage-controlled oscillator, or the like.

The receiver included in the signal transceiver 142 may include a low noise amplifier (LNA) providing low noise signal amplification for reflection signals received via the receiving antenna, a mixer mixing the received signals resulted from the low noise amplifier, an amplifier amplifying the mixed received signals, an analog digital converter (ADC) converting the amplified received signals to digital signals and generating reception data, and the like.

The signal processor 144 may include a first processor and a second processor, and the first processor may be a pre-processor for the second processor. The first processor may obtain transmission data and reception data, control the oscillator to generate a transmission signal based on the obtained transmission data, synchronize the transmission data and the reception data, and apply a frequency transform to the transmission data and the reception data.

The second processor is a post-processor that performs substantial processing using a result obtained by the processing of the first processor. The second processor may perform constant false alarm rate (CFAR) computation, tracking computation, target selection computation, and the like, based on the frequency transformed reception data from the first processor, and extract or compute information on a target, such as angle information, speed information, and distance information.

The first processor may perform the frequency transform after buffering the obtained transmission data and the obtained reception data based on a unit sample size that can be processed for each period. The frequency transform performed by the first processor may use the Fourier transform, such as a fast Fourier transform (FFT), or the like.

The second processor may perform a second Fourier transform for a first Fourier-transformed signal from the first processor, and the second Fourier transform may be, for example, a discrete Fourier transform (hereinafter, referred to as "DFT"). Further, the second Fourier transform may be a chirp-DFT as one type of the DFT.

The second processor may obtain a frequency value corresponding to the number of frequencies corresponding to a length (K) of the second Fourier transform through the second Fourier transform such as the chirp-DFT etc., determine a bit frequency having the largest power during each chirp period based on the obtained frequency value, and then detect an object by obtaining information on a speed and a distance of the object based on the determined bit frequency.

Meanwhile, the controller 140 included in the radar apparatus 100 in accordance with embodiments of the present disclosure, and the signal transceiver 142 and signal processor 144 etc. included in the controller 140 may be implemented using one or more module(s) included in a radar control apparatus or an electronic or control circuitry ECU performing an object identification function using the radar.

The radar control apparatus or the electronic or control circuitry ECU may include a processor, a storage device such as a memory, a computer program for executing a specific functionality, or the like. The controller 140, the signal transceiver 142 and the signal processor 144 included in the controller, and the like may be implemented by respective software modules capable of each performing its specific functionality.

Figure 7:
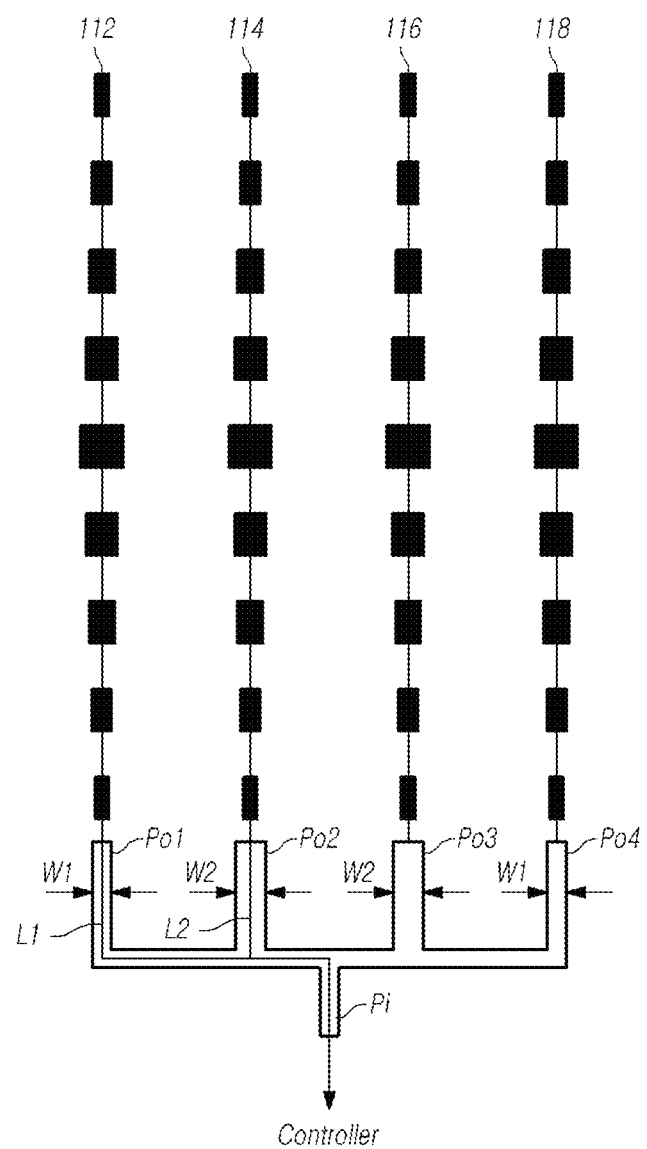
FIGS. 7 and 8 are enlarged diagrams illustrating the divider of the antenna apparatus in accordance with embodiments of the present disclosure.
Figure 8:
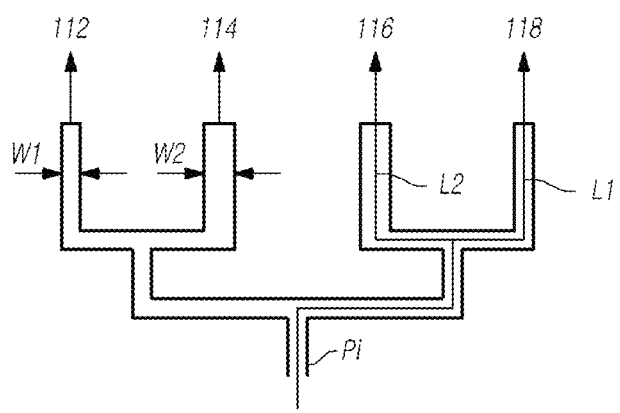

FIGS. 7 and 8 are enlarged diagrams illustrating the divider of the antenna apparatus in accordance with embodiments of the present disclosure.

The divider 130 in accordance with embodiments of the present disclosure performs a function of supplying a signal with a constant power ratio and a constant phase ratio to each of a plurality of transmitting antennas included in the transmitting antenna assembly 110 in order to form a single transmission beam pattern for allowing both a mid/long range target and a short range target to be detected.

The divider 130 in accordance with embodiments of the present disclosure may be implemented by a software-based active element using a control element, such as a specific circuitry, or be generally implemented by a passive element for configured to adjust a width, a length, or the like of a feed line connecting between each transmitting antenna and the controller (specifically, the transmitter of the transceiver).

That is, as shown in FIG. 7, the divider 130 in accordance with embodiments of the present disclosure may be implemented by the arrangement of a plurality of feed lines, and the divider may include, as the feed lines, an input-side feed line or an input port Pi to which a transmission signal is inputted and N output-side feed lines or output ports (Po1~Po4) connected to respective transmitting antennas.

The divider of FIG. 7 has a structure in which all of one input port and four output ports are bundled, and the divider of FIG. 8 has a structure in which four output ports are grouped by two.

The output ports or output-side feed lines Po1 to Po4 are connected to respective transmitting antennas 112, 114, 116, and 118, and each of the output-side feed lines has a preset line width W1 or W2.

In this configuration, power of a signal supplied to a corresponding transmitting antenna can be determined by the line width W1 or W2 of each output port or output-side feed line.

Accordingly, a ratio of power supplied to each transmitting antenna may be set by the width of the output-side feed line supplied up to each transmitting antenna.

In this case, the power ratio is set such that power of one or more first transmitting antenna(s) arranged in a center area among the N transmitting antennas has a greater value than power of second transmitting antennas arranged in both side areas of the center area.

Accordingly, as shown in FIGS. 7 and 8, the width of output-side feed lines connected to two first transmitting antennas 114 and 116 in the center area among N (N=4) transmitting antennas has a value of W2, and the width of output-side feed lines connected to two second transmitting antennas 112 and 118 arranged in both side areas of the center area has a value of W1 smaller than the W2.

Thus, the line widths W1 and W2 may be adjusted depending on a power ratio of a signal supplied to each transmitting antenna so that transmission beam patterns as in FIGS. 10 to 14 can be formed.

Further, lengths from the end of the input port to the ends of the output ports, that is, the total lengths of the feed lines up to respective transmitting antennas may be set as L1 and L2.

A phase ratio of a signal supplied to each transmitting antenna may be set through the length of each feed line of the divider supplied up to each transmitting antenna.

In this case, the phase ratio may be set such that, when defining a first phase of a signal transmitted from at least one first transmitting antenna arranged in a center area among the N transmitting antennas and a second phase of a signal transmitted from at least one second transmitting antenna arranged in both side areas of the center area, in case the first phase is set to 0°, the second phase can be set to a phase value of one of 0° to 120°.

Accordingly, as shown in FIGS. 7 and 8, the total length of feed lines connected to two first transmitting antennas 114 and 116 in the center area among N (N=4) transmitting antennas has a value of L2, and the total length of feed lines connected to two second transmitting antennas 112 and 118 arranged in both side areas of the center area has a value of L1 identical to or different from the L2.

In this case, the lengths L1 and L2 of the feed lines for adjusting the phase ratio have an identical phase when they become integer multiples of a wavelength $\lambda$ of a transmission signal.

Accordingly, when setting a phase of the first transmitting antenna to 0° and a phase of the second transmitting antennas in both sides of the first transmitting antenna to 90°, the L1 can be determined as $n\lambda+\lambda/4$ relative to the L2.

Meanwhile, each of a power ratio and a phase ratio between N/2 transmitting antennas arranged on one direction relative to the center of the center area and each of a power ratio and a phase ratio between N/2 transmitting antennas arranged in a direction opposite to the one direction may be set equally to each other. That is, if N transmitting antennas are arranged, power ratios and phase ratios between the respective N/2 transmitting antennas arranged on both sides relative to a line between two transmitting antennas may be set symmetrically.

For example, widths and lengths of respective output-side feed lines connected to N/2 transmitting antennas arranged in one direction can be set to be different from each other. Further, the width and length of the output-side feed line connected to each of N/2 transmitting antennas arranged in one direction and the width and length of the output-side feed line connected to each of N/2 transmitting antennas arranged in the other direction may be set to be symmetrical relative to the center of the center area.

Alternatively, the width of the output-side feed line connected to each of N/2 transmitting antennas arranged in one direction and the width of the output-side feed line connected to each of N/2 transmitting antennas arranged in the other direction may be set symmetrically; however the shapes of the feed lines may not be symmetrical. That is, the lengths of respective feed lines connected to transmitting antennas may be set symmetrically, however, shapes forming the corresponding lengths may be different from each other.

Figure 9:
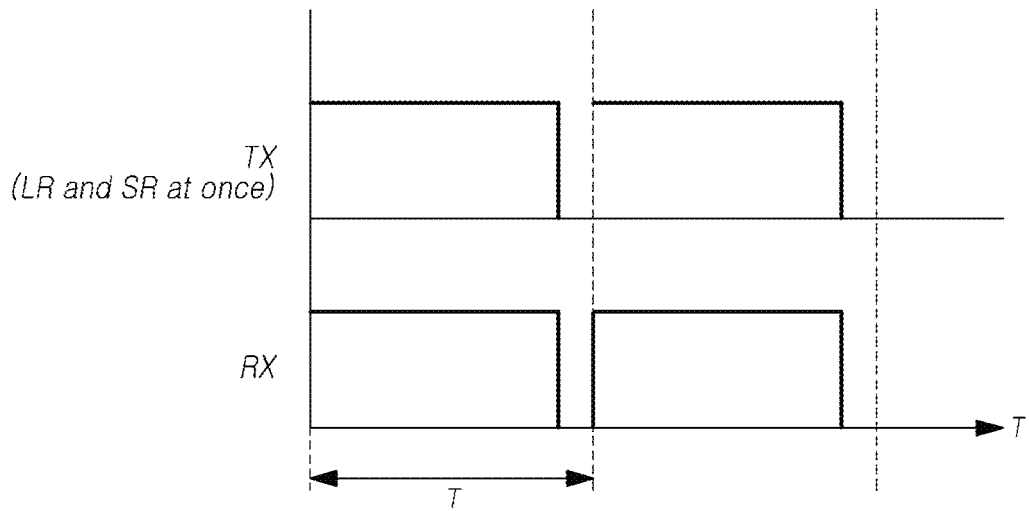
FIG. 9 is a timing diagram illustrating signals transmitted from and received to the radar sensor apparatus in accordance with embodiments of the present disclosure.

FIG. 9 is a timing diagram illustrating signals transmitted from and received to the radar sensor apparatus in accordance with embodiments of the present disclosure.

As shown in FIG. 9, when using the radar sensor apparatus in accordance with embodiments of the present disclosure, while turning on all N transmitting antennas at a constant power ratio and phase ratio during one detection period T and turning on a receiving antenna, a long range object can be detected by receiving a reflection wave corresponding to a transmission wave after the transmission wave in a single transmission beam pattern allowing both mid/long range detection and short range detection has been transmitted.

In the typical radar sensor apparatus as in FIG. 3, it is necessary to form a transmission beam pattern for long range detection and then detect a mid/long range target during the first detection period T1, and form a transmission beam pattern for short range detection and then detect a short range target during the second detection period T2. On the contrary, in accordance with embodiments of the present disclosure, it is possible to detect both a mid/long range target and a short range target during a single detection period.

Accordingly, since a detection period is reduced, detection performance can be improved, and since it is not necessary to arrange a mid/long range transmitting antenna and a short range transmitting antenna separately, the radar sensor device can be simplified.

Further, it is possible to reduce a computational load by performing computation for a mid/long range target and computation for a short range target at once.

FIGS. 10 to 14 illustrate examples of transmission beam patterns generated by the radar sensor apparatus in accordance with embodiments of the present disclosure, and illustrate forms of transmission beam patterns according to the number of transmitting antennas (N), a power ratio and a phase ratio of the divider.

When the transmitting antenna assembly and the divider as described above are used, by adjusting a power ratio and a phase ratio of a signal supplied to N transmitting antennas, a transmission beam pattern may be formed in the form of allowing both a mid/long range target and a short range target to be detected.

Figure 10:
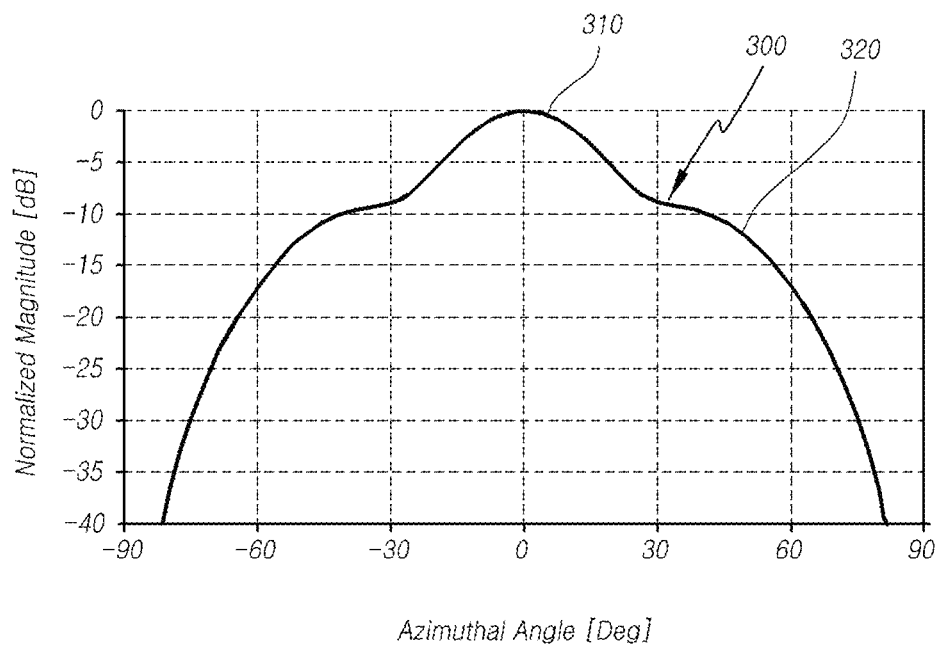
FIGS. 10 to 14 illustrate examples of transmission beam patterns generated by the radar sensor apparatus in accordance with embodiments of the present disclosure, and illustrate forms of transmission beam patterns according to the number of transmitting antennas (N), and a power ratio and a phase ratio of the divider.

As illustrated in FIG. 10, a transmission beam pattern 300 generated by embodiments of the present disclosure may include a main part 310 with a central peak for long range target detection and side parts 320 located on both sides of the main part for short range target detection. A null point is not formed between the main part and the side part in the transmission beam pattern 300.

For long range target detection of the transmission beam pattern 300, the main part 310 is formed at about 10° to the left and right relative to a horizontal angle of 0°, and is an interval having the greatest power.

The side parts 320 of the transmission beam pattern 300 are symmetrically formed on both sides of the main part. While the side parts 320 include areas of 20~40° and −20~−40° for short range target detection, it is desirable for power not to decrease suddenly in these areas.

Further, it is desirable for the transmission beam pattern 300 herein not to have a null point as shown in the mid/long range transmission beam pattern of FIG. 4.

In FIGS. 10 to 14, N represents the number of transmitting antennas, and a power ratio and a phase ratio represent ratios in order from a transmission antenna on one side to a transmission antenna on the other side.

Further, when power of two first transmitting antennas arranged in a center area is 1, the power ratio represents a relative power ratio between transmitting antennas, and when phases of signals of the two first transmitting antennas arranged in the center area are 0, the phase ratio represents phase angles (°) of the remaining second transmitting antennas.

FIG. 10 shows a transmission beam pattern where the number of transmitting antennas is 4, the power ratio is 0.7:1:1:0.7, and the phase ratio is 60:0:0:60.

Figure 11:
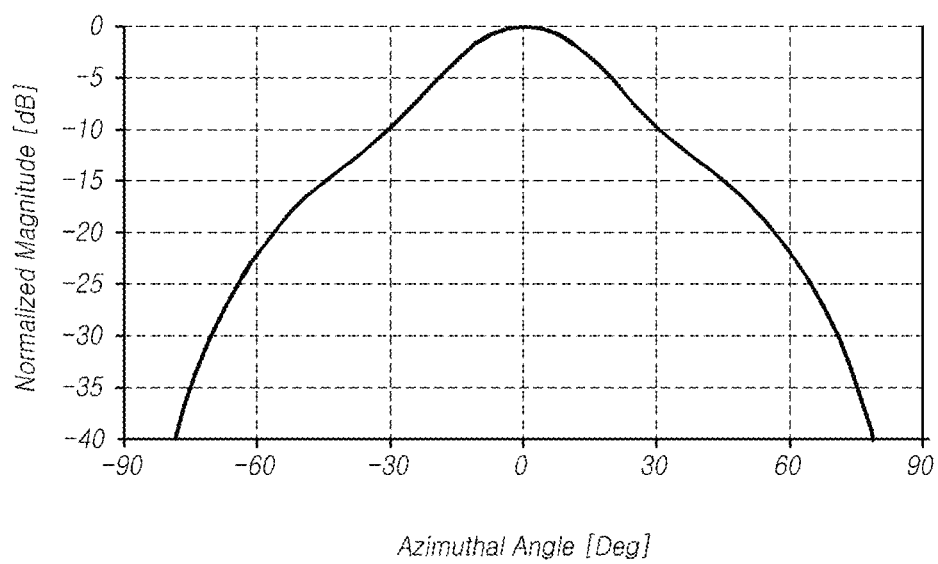
Figure 12:
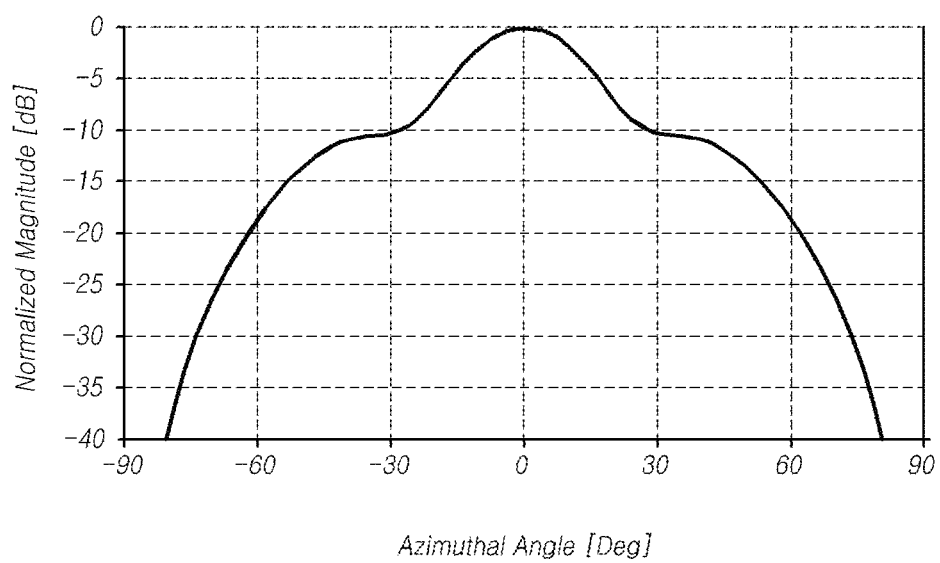

FIG. 11 shows a transmission beam pattern where the number of transmitting antennas is 6 (N=6), and the power ratio and the phase ratio are 0.1:0.2:1:1:0.2:0.1 and 0:0:0:0:0:0, respectively. FIG. 12 shows a transmission beam pattern where the number of transmitting antennas is 6 (N=6), and the power ratio and the phase ratio are 0.1:0.9:1:1:0.9:0.1 and 100:50:0:0:50:100, respectively.

Figure 13:
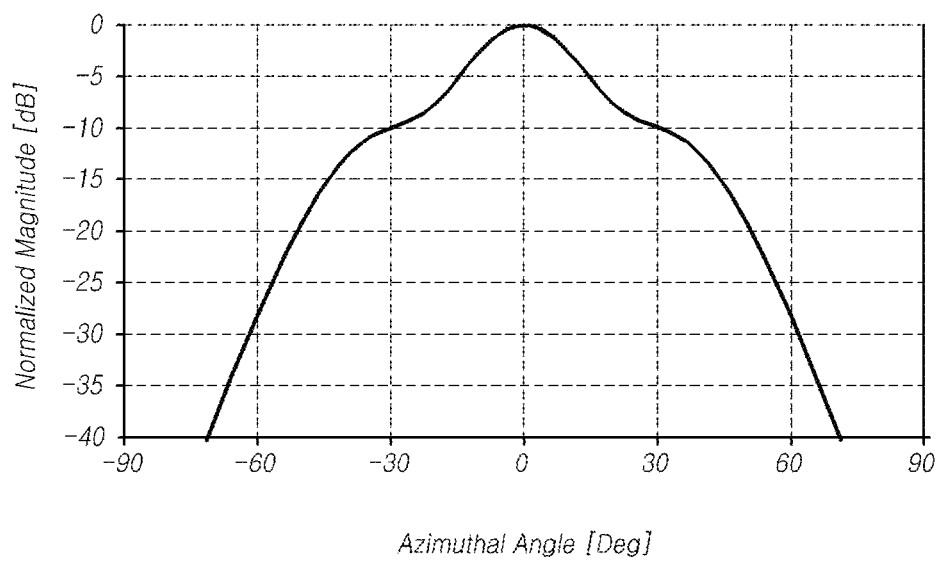
Figure 14:
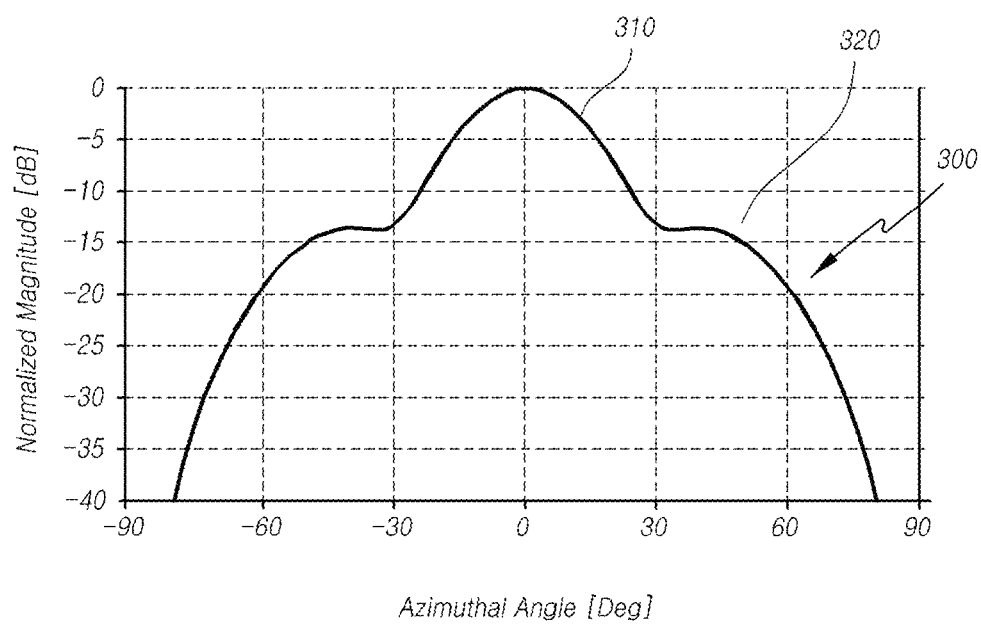

FIG. 13 shows a transmission beam pattern where the number of transmitting antennas is 8 (N=8), and the power ratio and the phase ratio are 0.1:0.13:0.2:1:1:0.2:0.13:0.1 and 0:0:0:0:0:0:0:0, respectively. FIG. 14 shows a transmission beam pattern where the number of transmitting antennas is 8 (N=8), and the power ratio and the phase ratio are 0.1:0.13:0.9:1:1:0.9:0.13:0.1 and 120:80:40:0:0:40:80:120, respectively.

As described above, in accordance with embodiments of the present disclosure, as shown in FIGS. 10 to 14, by supplying a transmission signal with a constant power ratio and phase ratio to each of an even number of transmitting antennas larger than four, it is possible to form a transmission beam pattern including a main part 310 with a central peak for long range target detection, side parts 320 located on both sides of the main part for short range target detection, and no null point between the main part and the side part.

Using such a transmission beam pattern, it is possible to obtain information on a mid/long range target and a short range target simultaneously.

Figure 15:
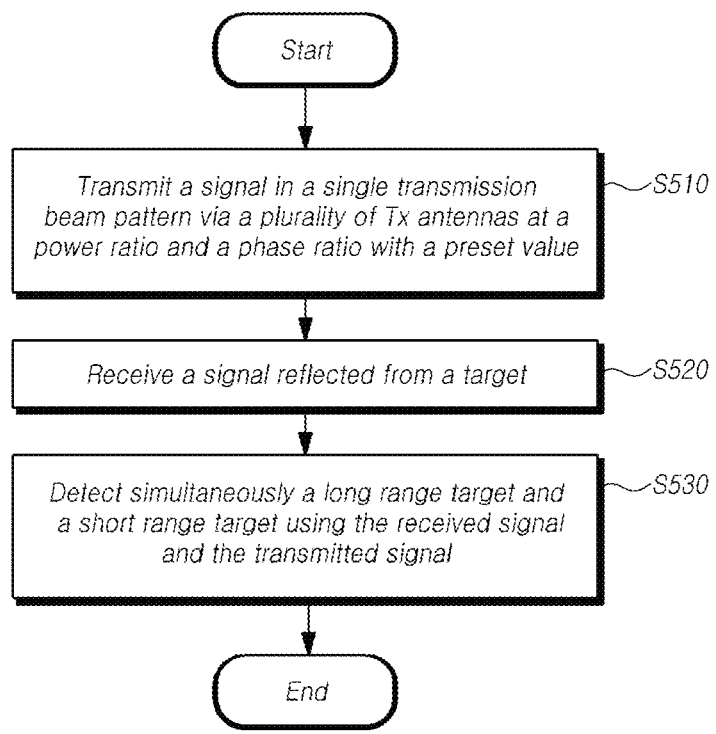
FIG. 15 is a flow diagram illustrating a target detecting method for the radar sensor apparatus in accordance with embodiments of the present disclosure.

FIG. 15 is a flow diagram illustrating an object detecting method for the radar sensor apparatus in accordance with embodiments of the present disclosure.

Referring to FIG. 15, an object detecting method in accordance with embodiments of the present disclosure is a method of detecting an object using a radar sensor apparatus including a transmitting antenna assembly including N (N is an even number greater than or equal to 4) transmitting antennas, a receiving antenna assembly, a divider for supplying signals to the N transmitting antennas of the transmitting antenna assembly, and a controller. The method includes a signal transmitting step S510, a signal receiving step S520 and information extraction step S530.

In the signal transmitting step S510, by setting a preset value on a power ratio that is a ratio of power supplied to each transmitting antenna and a phase ratio that is a ratio of phase of a signal transmitted from each transmitting antenna using the transmitting antenna assembly and the divider, a signal can be transmitted in a transmission beam pattern having a form allowing both a mid/long range target and a short range target to be detected.

Discussions conducted above with reference to FIGS. 5 to 14 are equally or substantially equally applicable to a method of forming such a single transmission beam pattern, and a transmitting antenna and a divider for the single transmission beam pattern; therefore, corresponding discussions will not be repeatedly performed for convenience of description.

In the signal receiving step S520, one or more signals reflected from one or more of a mid/long range target and a short range target can be received using the receiving antenna assembly.

In the information extraction step S530, information on one or more of the mid/long range target and the short range target can be obtained by processing the received signals using the controller.

In addition, in order to perform all of the embodiments described above with reference to FIGS. 5 to 14, the order of the specific steps may be changed, or the object detection method may further include one or more specific step.

When using the single transmission beam pattern according to embodiments of the present disclosure, in the information extraction step S530, information on both a mid/long range target and a short range target can be obtained using the transmitted signals and the received signals.

It should be noted that embodiments of the present disclosure are not limited to the structures of the antenna assembly according to the embodiments described above; therefore, other structures of the antenna assembly may be available as well.

The radar sensor comprises one or more transmitting antennas transmitting a radar signal, and one or more receiving antennas receiving a signal reflected from an object.

Meanwhile, the radar sensor according to embodiments of the present disclosure can employ a signal transmission and reception technique based on a multidimensional antenna array and a multiple input multiple output (MIMO) in order to form a virtual antenna aperture greater than an actual antenna aperture.

For example, a two-dimensional antenna array can be employed to accomplish the accuracy of an angle to the vertical and/or the horizontal and a desired resolution. In case the two-dimensional radar antenna array is used, signals are transmitted and received by two separate scans (time multiplexed) horizontally and vertically, and the MIMO can be used separately from the horizontal and vertical scans (time multiplexed) by the two-dimensional antenna array.

More specifically, the radar sensor according to embodiments of the present disclosure can comprise a two-dimensional antenna array including a transmitting antenna assembly including a total of 12 transmitting antennas Tx and a receiving antenna assembly including a total of 16 receiving antennas Rx; as a result, a total of 192 virtual receiving antennas can be arranged.

Further, in another embodiment, in a case where one or more antennas of the radar sensor can be arranged using the two-dimensional antenna array, for example, each antenna patch can be arranged in a diamond or rhombus shape; therefore, unnecessary side lobes can be reduced.

Alternatively, the two-dimensional antenna arrangement can comprise a V-shape antenna array in which a plurality of radiating patches is arranged in a V-shape, and more specifically, comprise two V-shape antenna arrays. In this case, a single feed is performed to the apex of each V-shape antenna array.

Alternatively, the two-dimensional antenna arrangement can comprise a X-shape antenna array in which a plurality of radiating patches is arranged in a X-shape, and more specifically, comprise two X-shape antenna arrays. In this case, a single feed is performed to the center of each X-shape antenna array.

Further, the radar sensor according to embodiments od the present disclosure can employ the MIMO antenna system to accomplish the accuracy of an angle to the vertical and/or the horizontal and a desired resolution.

More specifically, in the MIMO system, each transmitting antenna can transmit a signal with a waveform independent of one another. That is, each transmitting antenna can transmit a signal with a waveform independent of the other transmitting antenna(s), and then each receiving antenna can determine which transmitting antenna a signal received from an object is transmitted from due to the using of the independent waveform for each transmitting antenna.

Further, the radar sensor according to embodiments of the present disclosure can comprise a radar housing in which a substrate on which the antenna assembly is disposed and a circuitry are accommodated, and a radome served as an enclosure of the radar housing. The radome can be formed of a material capable of decreasing attenuation of radar signals transmitted and received, and constitute a front or rear bumper, a grille, or a side body of the vehicle, or an exterior surface of one or more components of the vehicle.

That is, the radome of the radar sensor can be disposed inside of the bumper, the grille, or the body of the vehicle, or be disposed as a part of a component constituting the exterior surface of the vehicle, such as a part of the bumper, the grille, or the body of the vehicle. Therefore, the radome can improve the aesthetics of the vehicle and provide the convenience of mounting the radar sensor.

The radar sensor or the radar sensor apparatus/system used in the present disclosure can include at least one radar sensor subsystem, for example, one or more of a front detection radar sensor mounted in the front of the vehicle, a rear detection radar sensor mounted in the rear of the vehicle, and a side or side-rear detection radar sensor mounted in a side of the vehicle. The radar sensor or the radar sensor apparatus/system can process data by analyzing a transmitting signal and a receiving signal, and as a result, extract information on an object. To do this, the radar sensor or the radar sensor apparatus/system can include an electronic or controlling circuitry ECU, or a processor. Data transmission or signal communication from the radar sensor to the electronic or control circuitry ECU or the processor can use a communication link, such as a vehicle network bus, or the like.

When using the embodiments of the present disclosure as described above, it is possible to provide a radar sensor apparatus for a vehicle with a simplified configuration and a small amount of computation, and an antenna apparatus for the radar sensor apparatus.

Further, in the vehicle radar sensor apparatus, while including one transmitting antenna assembly, it is possible to provide an effect of forming a transmission beam pattern enabling mid/long range detection and short range detection simultaneously.

More specifically, while including an N (N is an even number greater than or equal to 4) transmitting antennas and a divider, a preset value is set on a power ratio that is a ratio of power supplied to each transmitting antenna and a phase ratio that is a ratio of phase of a signal transmitted from each transmitting antenna; it is therefore possible to provide an effect of forming a transmission beam pattern enabling mid/long range detection and short range detection simultaneously and performing mid/long range target detection and short range target detection simultaneously through this.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s). Further, each of the configurations or elements included in one or more of the embodiments may be implemented by an independent hardware configuration; however, some or all of the configurations or elements may be selectively combined and implemented by one or more computer program(s) having one or more program module(s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar sensor apparatus for a vehicle comprising:
a transmitting antenna assembly including N transmitting antennas; wherein the N is an even number greater than or equal to and the N transmitting antennas comprise first and second transmitting antennas;
a receiving antenna assembly;
a divider supplying signals to the N transmitting antennas of the transmitting antenna assembly; Wherein power supplied to the first transmitting antennas by the divider and power supplied to the second transmitting antennas by the divider are different from each other; and
a controller causing a transmission signal with a constant transmission beam pattern to be transmitted via the transmitting antenna assembly and obtaining information on a target by processing signals received from the receiving antenna assembly,
wherein the divider comprises first feed lines connecting between the first transmitting antennas and the controller and second feed lines connecting between the second transmitting antennas and the controller, and widths of the first feed lines, connected to the first transmitting antennas arranged closer to a center of the N transmitting antennas than the second transmitting antennas, are wider than widths of the second feed lines, connected to the second transmitting antennas arranged farther than the first transmitting antennas from the center of the N transmitting antennas to supply more power to the first transmitting antennas than the second transmitting antennas.

2. The radar sensor apparatus for the vehicle according to claim 1, wherein the transmission beam pattern of the transmission signal transmitted by the transmitting antenna assembly covers a first range and a second range, a distance of the first range is set longer than a distance of the second range, and a detection angle with the first range is set narrower than a detection angle with the second range.

3. The radar sensor apparatus for the vehicle according to claim 1, wherein the controller is configured to control to transmit the transmission signal with the transmission beam pattern including a main part with a central peak for long range target detection and side parts located on both sides of the main part for short range target detection without a null-point.

4. The radar sensor apparatus for the vehicle according to claim 1, wherein the power ratio is set such that power of one or more first transmitting antennas arranged in a center area among the N transmitting antennas has a greater value than power of second transmitting antennas arranged in both side areas of the center area.

5. The radar sensor apparatus for the vehicle according to claim 4, wherein the phase ratio is set such that, when defining a first phase of a signal transmitted from the one or more first transmitting antennas arranged in the center area among the N transmitting antennas and a second phase of a signal transmitted from the second transmitting antennas arranged in the both side areas of the center area, in case the first phase is set to 0°, the second phase is set to a phase value of one of 0° to 120°.

6. The radar sensor apparatus for the vehicle according to claim 5, wherein the preset power ratio is set depending on a width of an output-side feed line connected to each transmitting antenna, and the preset phase ratio is set depending on a length of a feed line connected to each transmitting antenna.

7. The radar sensor apparatus for the vehicle according to claim 4, wherein each of a power ratio and a phase ratio between N/2 transmitting antennas arranged on one direction relative to a center of the center area and each of a power ratio and a phase ratio between N/2 transmitting antennas arranged in a direction opposite to the one side is set equally to each other.

8. The radar sensor apparatus for the vehicle according to claim 7, wherein widths and lengths of respective output-side feed lines connected to the N/2 transmitting antennas arranged in the one direction are sotto be different from each other, and the widths and lengths of respective output-side feed lines connected to the N/2 transmitting antennas arranged in the one direction and widths and lengths of respective output-side feed lines connected to the N/2 transmitting antennas arranged in the other direction are symmetrical relative to the center of the center area.

9. An antenna apparatus in a radar sensor apparatus for a vehicle, the antenna apparatus comprising:
a transmitting antenna assembly including N transmitting antennas, wherein the N is an even number greater than or equal to 4, and the N transmitting antennas comprise first and second transmitting antennas;
a receiving antenna assembly; and
a divider including at least one feed line connected to the N transmitting antennas of the transmitting antenna assembly and supplying signals to the N transmitting antennas, wherein power supplied to the first transmitting antennas by the divider and power supplied to the second transmitting antennas by the divider are different from each other,
wherein the divider is configured such that a width and a length of a feed line connected to each transmitting antenna are set so that a preset value is set on a power ratio that is a ratio between power supplied to each transmitting antenna and a phase ratio that is a ratio between phase of a signal transmitted from each transmitting antenna, and
wherein the divider comprises first feed lines connecting between the first transmitting antennas and the controller and second feed lines connecting between the second transmitting antennas and the controller, and widths of the first feed lines, connected to the first transmitting antennas arranged closer to a center of the N transmitting antennas than the second transmitting antennas, are wider than widths of the second feed lines, connected to the second transmitting antennas arranged farther than the first transmitting antennas from the center of the N transmitting antennas to supply more power to the first transmitting antennas than the second transmitting antennas.

10. The antenna apparatus according to claim 9, wherein the transmitting antenna assembly is configured to radiate a pattern of transmission beams including a main part with a central peak for long range target detection and side parts located on both sides of the main part for short range target detection.

11. The antenna apparatus according to claim 9, wherein the power ratio is set such that power of one or more first transmitting antennas arranged in a center area among the N transmitting antennas has a greater value than power of second transmitting antennas arranged in both side areas of the center area.

12. The antenna apparatus according to claim 11, wherein the phase ratio is set such that, when defining a first phase of a signal transmitted from the one or more first transmitting antennas arranged in the center area among the N transmitting antennas and a second phase of a signal transmitted from the second transmitting antennas arranged in the both side areas of the center area, in case the first phase is set to 0°, the second phase is set to a phase value of one of 0° to 120°.

13. The antenna apparatus according to claim 9, wherein the preset power ratio is set depending on the width of at least one output-side feed line of the at least one feed line, and the preset phase ratio is set depending on the length of the at least one feed line.

14. The antenna apparatus according to claim 11, wherein each of a power ratio and a phase ratio between N/2 transmitting antennas arranged on one direction relative to a center of the center area and each of a power ratio and a phase ratio between N/2 transmitting antennas arranged in a direction opposite to the one side is set equally to each other.

15. The antenna apparatus according to claim 14, wherein widths and lengths of respective output-side feed lines connected to the N/2 transmitting antennas arranged in the one direction are set to be different from each other, and the widths and lengths of respective output-side feed lines connected to the N/2 transmitting antennas arranged in the one direction and widths and lengths of respective output-side feed lines connected to the N/2 transmitting antennas arranged in the other direction are symmetrical relative to the center of the center area.

16. A method of detecting an object using a radar sensor apparatus for a vehicle including a transmitting antenna assembly including N transmitting antennas comprising first and second transmitting antennas, wherein the N is an even number greater than or equal to 4, a receiving antenna assembly, a divider supplying signals to the N transmitting antennas of the transmitting antenna assembly, and a controller, the method comprising:

transmitting a signal in a transmission beam pattern by setting a preset value on a power ratio that is a ratio between power supplied to each transmitting antenna of the N transmitting antennas and a phase ratio that is a ratio between phase of a signal transmitted from each transmitting antenna of the N transmitting antennas using the transmitting antenna assembly and the divider such that power supplied to the first transmitting antennas by the divider and power supplied to the second transmitting antennas by the divider are different from each other, wherein the transmission beam pattern includes a main part with a central peak for long range target detection and side parts located on both sides of the main part for short range target detection without a null-point;

receiving a signal reflected from one or more of the first range target and the second range target using the receiving antenna assembly; and obtaining information on one or more or the first range target and the second range target by processing the received signal using the controller, wherein the first range is set longer than the second range, and a detection angle with the first range is set narrower than a detection angle with the second range.

17. The method according to claim 16, wherein the power ratio is set such that power of the first transmitting antennas arranged closer to a center of the N transmitting antennas than the second transmitting antennas, is greater than power of the second transmitting antennas arranged farther than the first transmitting antennas from the center of the N transmitting antennas.

18. The method according to claim 17, wherein each of a power ratio and a phase ratio between N/2 transmitting antennas arranged on one direction relative to a center of the center area and each of a power ratio and a phase ratio between N/2 transmitting antennas arranged in a direction opposite to the one side is set equally to each other.

19. The method according to claim 18, wherein widths and lengths of respective output-side feed lines connected to the N/2 transmitting antennas arranged in the one direction are set to be different from each other, and the widths and lengths of respective output-side feed lines connected to the N/2 transmitting antennas arranged in the one direction and widths and lengths of respective output-side feed lines connected to the N/2 transmitting antennas arranged in the other direction are symmetrical relative to the center of the center area.

* * * * *